United States Patent
Nieten et al.

(10) Patent No.: US 12,012,144 B2
(45) Date of Patent: Jun. 18, 2024

(54) METHOD AND CONTROL UNIT FOR TRANSVERSELY GUIDING A VEHICLE DURING FOLLOWING TRAVEL

(71) Applicant: Bayerische Motoren Werke Aktiengesellschaft, Munich (DE)

(72) Inventors: Volker Nieten, Emmering (DE); Hagen Stuebing, Munich (DE); Benedikt Weiser, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 251 days.

(21) Appl. No.: 17/288,160

(22) PCT Filed: Oct. 23, 2019

(86) PCT No.: PCT/EP2019/078806
§ 371 (c)(1),
(2) Date: Apr. 23, 2021

(87) PCT Pub. No.: WO2020/083964
PCT Pub. Date: Apr. 30, 2020

(65) Prior Publication Data
US 2021/0354755 A1  Nov. 18, 2021

(30) Foreign Application Priority Data
Oct. 26, 2018 (DE) .................. 10 2018 126 832.7

(51) Int. Cl.
*B60W 30/165* (2020.01)
*B60W 30/12* (2020.01)
*B62D 15/02* (2006.01)

(52) U.S. Cl.
CPC ........... *B62D 15/025* (2013.01); *B60W 30/12* (2013.01); *B60W 30/165* (2013.01);
(Continued)

(58) Field of Classification Search
CPC B62D 15/026; B62D 15/025; B62D 15/0255; B60W 30/12; B60W 10/20;
(Continued)

(56) References Cited

U.S. PATENT DOCUMENTS 9,159,023 B2 * 10/2015 Bone ............... B60W 30/18163
10,518,782 B2 * 12/2019 Aoki ..................... B60W 40/09
(Continued)

FOREIGN PATENT DOCUMENTS

CN 104520159 A 4/2015
CN 107580572 A 1/2018
(Continued)

OTHER PUBLICATIONS

Korean-language Office Action issued in Korean Application No. 10-2021-7010263 dated Nov. 7, 2022 with English translation (nine (9) pages).
(Continued)

*Primary Examiner* — Khoi H Tran
*Assistant Examiner* — Bryant Tang
(74) *Attorney, Agent, or Firm* — Crowell & Moring LLP

(57) ABSTRACT

A control unit is provided for an ego vehicle equipped with a transverse guidance actuator which is designed to transversely guide the ego vehicle in an at least partly automated manner during a follow-on drive. The control unit is designed to detect a transverse guidance maneuver of the ego vehicle required for the follow-on drive. The control unit is additionally designed to ascertain driver information with respect to the driver of the ego vehicle, the driver information including at least one indication of how engaged the driver is with monitoring and/or carrying out the transverse guidance of the ego vehicle. The control unit is further designed to set a dynamic of an intervention, which is automatically carried out by the transverse guidance actuator
(Continued)

of the ego vehicle, for the transverse guidance maneuver on the basis of the ascertained driver information.

10 Claims, 3 Drawing Sheets

(52) U.S. Cl.
CPC ..... *B60W 2540/18* (2013.01); *B60W 2552/53* (2020.02); *B60W 2710/202* (2013.01); *B60W 2710/207* (2013.01)

(58) Field of Classification Search
CPC ........... B60W 30/10; B60W 2710/207; B60W 2540/18; B60W 2420/52; B60W 2510/202; B60W 2420/54; B60W 2420/42; B60W 2552/53; B60W 2710/202; B60W 30/165
See application file for complete search history.

(56) References Cited

U.S. PATENT DOCUMENTS

| | | | |
|---|---|---|---|
| 11,242,059 B2* | 2/2022 | Ozay | B60W 30/0956 |
| 2010/0256869 A1 | 10/2010 | Lich et al. | |
| 2015/0151757 A1 | 6/2015 | de Bruin et al. | |
| 2015/0259006 A1 | 9/2015 | Inoue | |
| 2016/0001811 A1 | 1/2016 | Endo et al. | |
| 2016/0297478 A1 | 10/2016 | Inoue et al. | |
| 2018/0201318 A1 | 7/2018 | Kataoka et al. | |
| 2018/0304883 A1 | 10/2018 | Mueller | |
| 2019/0389455 A1* | 12/2019 | Reed | G06V 20/58 |
| 2020/0298859 A1* | 9/2020 | Ozay | B60W 30/0956 |

FOREIGN PATENT DOCUMENTS

| | | |
|---|---|---|
| DE | 10 2007 029 909 A1 | 1/2009 |
| DE | 10 2008 010 631 A1 | 9/2009 |
| DE | 10 2016 214 096 A1 | 2/2018 |
| JP | 10-166895 A | 6/1998 |
| JP | 2004-206275 A | 7/2004 |
| JP | 2004-231096 A | 8/2004 |
| JP | 2010-188854 A | 9/2010 |
| JP | 2013-132923 A | 7/2013 |
| JP | 2016-199114 A | 12/2016 |
| JP | 2017-47799 A | 3/2017 |
| JP | 2018-114806 A | 7/2018 |
| WO | WO 2017/184052 A1 | 10/2017 |

OTHER PUBLICATIONS

"Rechtsfolgen zunehmender Fahrzeugautomatisierung", Bundesanstalt fuer Strassenwesen (BASt) [German Federal Highway Research Institute], Forschung kompakt [Research News], Edition Nov. 2012 with English Abstract (two (2) pages).

"(R) Taxonomy and Definitions for Terms Related to Driving Automation Systems for On-Road Motor Vehicles", Surface Vehicle Recommended Practice, SAE (Society of Automotive Engineering) International, J3016™, Sep. 2016, pp. 1-30 (30 pages).

International Search Report (PCT/ISA/210) issued in PCT Application No. PCT/EP2019/078806 dated Jan. 24, 2020 with English translation (five (5) pages).

German-language Written Opinion (PCT/ISA/237) issued in PCT Application No. PCT/EP2019/078806 dated Jan. 24, 2020 (six (6) pages).

German-language Search Report issued in German Application No. 10 2018 126 832.7 dated Jul. 2, 2019 with partial English translation (13 pages).

Chinese-language Office Action issued in Chinese Application No. 201980070819.6 dated Apr. 20, 2023 with English translation (14 pages).

Japanese-language Office Action issued in Japanese Application No. 2021-522390 dated Jul. 4, 2023 with English translation (19 pages).

* cited by examiner

METHOD AND CONTROL UNIT FOR TRANSVERSELY GUIDING A VEHICLE DURING FOLLOWING TRAVEL

BACKGROUND AND SUMMARY OF THE INVENTION

The invention relates to a method and an appropriate control unit for the at least semi-automated transverse guidance of a vehicle.

A vehicle can include one or multiple driver assistance system(s) (DAS), which assist a driver of the vehicle during the longitudinal and/or transverse guidance of the vehicle. These can be, in particular, so-called SAE level 2 systems, in which the longitudinal and/or transverse guidance can in fact be carried out in an automated manner by the vehicle, but in which the driver must permanently monitor the automated driving of the vehicle.

An exemplary DAS is a steering and lane guidance assistant, in which the longitudinal and transverse guidance of the vehicle is carried out in an automated manner by the vehicle, in order to hold the vehicle in a lane in an automated manner. The vehicle can be configured for detecting a lane marking on the basis of sensor data of one or multiple surroundings sensor(s) of the vehicle and guiding the vehicle on the basis of the detected lane markings. Moreover, the vehicle can be configured for detecting a preceding vehicle on the basis of the sensor data and guiding the vehicle in such a way that the vehicle follows the preceding vehicle. Such following travel can be carried out, in particular, for the case in which, temporarily, no lane markings can be detected (for example, due to heavy traffic and/or due to contamination on the roadway). In this way, the availability of the steering and lane guidance assistant can be increased (for example, at relatively low driving speeds of 100 km/h or less).

During the operation of the steering and lane guidance assistant by means of following travel, a lateral collision of the vehicle could occur when the driver of the vehicle does not sufficiently monitor the assisted driving and the preceding vehicle carries out a lane change.

The aforementioned document addresses the technical objective of increasing the safety and/or the availability of a (SAE level 2) driver assistance system, in particular, of a steering and lane guidance assistant.

The problem is solved by each of the independent claims. Advantageous embodiments are described, among other things, in the dependent claims. It is pointed out that additional features of a patent claim, which is dependent on an independent patent claim, can form an invention, which is separate and independent of the combination of all features of the independent claim, without the features of the independent patent claim or only in combination with a subset of the features of the independent patent claim, which can be made the subject matter of an independent claim, a divisional application, or a subsequent application. This applies in a similar way for technical teachings described in the description, which can form an invention independent of the features of the independent patent claims.

According to one aspect, a control unit for an ego vehicle is described, which includes a transverse guidance actuator (for example, an electric steering actuator) configured for carrying out the transverse guidance of the ego vehicle in an at least semi-automated manner during following travel. The following travel can take place within the scope of a driver assistance system according to SAE level 2. Alternatively or additionally, the following travel can take place within the scope of a lane guidance assistant, which is configured for guiding the ego vehicle at least intermittently in an automated manner along a lane of a roadway. The following travel can take place (if necessary, solely or exclusively) on the basis of a driving trajectory of a preceding vehicle traveling ahead of the ego vehicle. For this purpose, the ego vehicle can include one or multiple surroundings sensor(s) (for example, a radar sensor, an image camera, an ultrasonic sensor, a LIDAR sensor, etc.), in order to gather sensor data regarding the preceding vehicle.

In particular, the control unit can be configured, within the scope of an automated lane guidance of the ego vehicle on a roadway, for ascertaining sensor data regarding surroundings of the ego vehicle. Moreover, it can be determined on the basis of the sensor data that, although the automated lane guidance can no longer be carried out on the basis of lane markings of the roadway, it can be carried out, at least temporarily (if necessary, solely), as following travel on the basis of a preceding vehicle indicated by the sensor data. The aspects described in this document can relate to such (possibly, pure) following travel of the ego vehicle.

The control unit can be configured for detecting a transverse guidance maneuver of the ego vehicle necessary for following travel. In other words, it can be detected that an intervention by the transverse guidance actuator is necessary for the following travel (for example, in order to guide the ego vehicle along the trajectory of the preceding vehicle). Moreover, it can be detected that the necessary intervention by the transverse guidance actuator reaches or exceeds a predefined intervention threshold value (and, thereby, will result in a considerable change of the travel direction of the ego vehicle).

Moreover, the control unit is configured for ascertaining driver information with respect to a driver of the ego vehicle. The driver information can include at least one indication of how engaged the driver is with monitoring and/or carrying out the transverse guidance of the ego vehicle.

The driver information can include, in particular, a steering contribution of the driver to the steering of the ego vehicle (in particular to the steering for the transverse guidance maneuver). For example, the steering contribution provided by the driver of the ego vehicle for the steering and/or the transverse guidance of the ego vehicle can be observed over a certain period of time. Therefore, a (time-averaged) steering contribution of the driver to the steering of the ego vehicle can be ascertained (for example, in percent). A relatively high steering contribution can be evaluated as an indication that the driver is relatively intensively engaged with carrying out the transverse guidance of the ego vehicle, while a relatively low steering contribution can be evaluated as an indication that the driver is relatively mildly engaged with carrying out the transverse guidance of the ego vehicle.

For the detected transverse guidance maneuver for carrying out the following travel, it can be necessary, for example, to provide a total value of a steering torque and/or of a steering angle (in order to guide the ego vehicle behind the preceding vehicle). The steering contribution of the driver can then indicate the portion of the total value of the steering torque and/or of the steering angle that is provided as a result of an actuation of a steering means, in particular of the steering wheel, of the ego vehicle by the driver of the ego vehicle.

In addition, the control unit is configured for adjusting the dynamics of an intervention, which is carried out in an automated manner by the transverse guidance actuator of the ego vehicle, for the transverse guidance maneuver as a function of the ascertained driver information. The dynamics of the intervention by the transverse guidance actuator for the transverse guidance maneuver can be set relatively high when the driver information indicates that the driver is relatively intensively engaged with monitoring and/or carrying out the transverse guidance of the ego vehicle. On the other hand, the dynamics of the intervention by the transverse guidance actuator for the transverse guidance maneuver can be set relatively low when the driver information indicates that the driver is relatively mildly engaged with monitoring and/or carrying out the transverse guidance of the ego vehicle.

Due to the adaptation and/or adjustment of the dynamics of an intervention by the transverse guidance actuator as a function of the ascertained driver information, the safety and the availability of a lane guidance assistant can be increased. Moreover, in this way, a cooperative driving style between a driver and an ego vehicle, which is traveling in an at least semi-automated manner, can be made possible and/or supported.

The adaptation and/or adjustment of the dynamics of an intervention by the transverse guidance actuator as a function of the ascertained driver information can only take place, if necessary, for the case in which it was previously recognized that the detected transverse guidance maneuver will result in a considerable change of the travel direction of the ego vehicle. In other words, an adaptation and/or adjustment of the dynamics of an intervention by the transverse guidance actuator as a function of the ascertained driver information can only take place, if necessary, for the case in which the predicted intervention by the transverse guidance actuator for the transverse guidance maneuver is equal to or greater than a predefined intervention threshold value. Otherwise, a driver information-dependent adaptation and/or adjustment of the dynamics of an intervention by the transverse guidance actuator can not take place, if necessary. In this way, the comfort and the availability of a lane guidance assistant can be further increased.

The control unit can be configured for ascertaining setpoint dynamics of the intervention by the transverse guidance actuator for the transverse guidance maneuver that are necessary for carrying out the transverse guidance maneuver for the following travel. In other words, the dynamics of the intervention by the transverse guidance actuator that are necessary in order to continue carrying out the following travel can be ascertained.

The actual dynamics of the intervention by the transverse guidance actuator for the transverse guidance maneuver can then be set lower than the setpoint dynamics when the driver information indicates that the driver is relatively mildly engaged with monitoring and/or carrying out the transverse guidance of the ego vehicle. On the other hand, the setpoint dynamics can be set, if necessary, as the actual dynamics of the intervention by the transverse guidance actuator for the transverse guidance maneuver when the driver information indicates that the driver is relatively intensively engaged with monitoring and/or carrying out the transverse guidance of the ego vehicle.

The transverse guidance maneuver can therefore be carried out, if necessary, completely or nearly completely in an automated manner when the driver information indicates a relatively high degree of participation and/or monitoring by the driver. On the other hand, the portion of the execution of the transverse guidance maneuver brought about by the transverse guidance actuator can be significantly reduced (for example, by 20%, 40%, 50%, or more) when the driver information indicates a relatively low degree of participation and/or monitoring by the driver. In this way, the safety and the availability of a lane guidance assistant can be further increased.

The transverse guidance actuator can have one or multiple operating parameter(s) that have an effect on the dynamics of the intervention by the transverse guidance actuator. The one or multiple operating parameter(s) can include, for example, a steering torque, brought about by the transverse guidance actuator, at a steering device of the ego vehicle. Alternatively or additionally, the one or multiple operating parameter(s) can include a steering angle of the steering device of the ego vehicle brought about by the transverse guidance actuator.

The control unit can be configured for adjusting a maximally possible and/or minimally possible value of the one or multiple operating parameter(s) as a function of the driver information. In particular, the control unit can be configured for reducing, with respect to absolute value, a maximally possible and/or a minimally possible value of the one or multiple operating parameter(s) when the driver information indicates that the driver is relatively mildly engaged with monitoring and/or carrying out the transverse guidance of the ego vehicle. In this way, the dynamics of an intervention by the transverse guidance actuator can be adapted and/or adjusted in an efficient and reliable way.

Alternatively or additionally, the control unit can be configured for adjusting a maximally possible and/or minimally possible value of the gradient with respect to time and/or of the rate of change of the one or multiple operating parameter(s) as a function of the driver information. In particular, the control unit can be configured for reducing, with respect to absolute value, a maximally possible and/or minimally possible value of the gradient and/or the rate of change of the one or multiple operating parameter(s) when the driver information indicates that the driver is relatively mildly engaged with monitoring and/or carrying out the transverse guidance of the ego vehicle. In this way, the dynamics of an intervention by the transverse guidance actuator can be adapted and/or adjusted in an efficient and reliable way.

Moreover, the control unit can be configured for outputting an alert to the driver of the ego vehicle when the dynamics of the intervention by the transverse guidance actuator were reduced within the scope of following travel, in particular for the case in which the following travel must be aborted due to the reduced dynamics. Due to the output of an alert, the driver can be prompted to become more engaged with monitoring and/or carrying out the transverse guidance of the ego vehicle. In this way, the safety and, if necessary, the availability of a lane guidance assistant can be further increased.

According to a further aspect, a method is described for the at least semi-automated transverse guidance of an ego vehicle during following travel. The method includes detecting a transverse guidance maneuver of the ego vehicle necessary for the following travel. In addition, the method includes ascertaining driver information with respect to a driver of the ego vehicle, wherein the driver information includes at least one indication of how engaged the driver is with monitoring and/or carrying out the transverse guidance of the ego vehicle. Moreover, the method includes adjusting dynamics of an intervention, which is carried out in an automated manner by the transverse guidance actuator of the ego vehicle, for the transverse guidance maneuver as a function of the ascertained driver information.

According to a further aspect, a (road) motor vehicle (in particular a passenger car or a truck or a bus) is described, which includes the control unit described in this document.

According to a further aspect, a software (SW) program is described. The SW program can be configured for being run on a processor (for example, on a control unit of a vehicle), and, as a result, in order to carry out the method described in this document.

According to a further aspect, a memory medium is described. The memory medium can include a SW program, which is configured for being run on a processor, and, as a result, carrying out the method described in this document.

As described above, the present document addresses at least semi-automated driving and, in particular, driver assistance systems according to SAE level 2. The term "automated driving" can be understood to mean, within the scope of the document, driving with automated longitudinal or transverse guidance or autonomous driving with automated longitudinal and transverse guidance. Automated driving can be, for example, driving for a longer period of time on the expressway or driving for a limited period of time within the scope of parking or maneuvering. The term "automated driving" includes automated driving with any degree of automation. Exemplary degrees of automation are assisted, semi-automated, highly automated, or fully automated driving. These degrees of automation were defined by the Bundesanstalt für Straßenwesen (BASt) (German Federal Highway Research Institute) (see the BASt publication "Forschung kompakt" (Research News), edition November 2012). During assisted driving, the driver permanently carries out the longitudinal or transverse guidance, while the system takes over the particular other function within certain limits. During semi-automated driving (level 2), the system takes over the longitudinal and transverse guidance for a certain period of time and/or in specific situations, wherein the driver must permanently monitor the system as is also the case during assisted driving. During highly automated driving (level 3), the system takes over the longitudinal and transverse guidance for a certain period of time without the driver needing to permanently monitor the system; the driver must be capable of taking over the vehicle guidance within a certain period of time, however. During fully automated driving (level 4), the system can automatically manage the driving in all situations for a specific application; a driver is no longer necessary for this application. The four aforementioned degrees of automation correspond to the SAE levels 1 through 4 of the SAE J3016 standard (SAE—Society of Automotive Engineering). For example, highly automated driving corresponds to level 3 of the SAE J3016 standard. Moreover, the SAE J3016 standard also describes SAE level 5 as the highest degree of automation, which is not contained in the definition from the BASt. SAE level 5 corresponds to driverless driving, in which the system can automatically manage all situations similarly to a human driver during the entire trip; in general, a driver is no longer necessary.

It is important to note that the methods, devices, and systems described in this document can be utilized alone as well as in combination with other methods, devices, and systems described in this document. Moreover, any aspects of the methods, devices, and systems described in this document can be combined with each other in various ways. In particular, the features of the claims can be combined with each other in various ways.

The invention is described in greater detail in the following on the basis of exemplary embodiments.

DETAILED DESCRIPTION OF THE DRAWINGS

Figure 1:
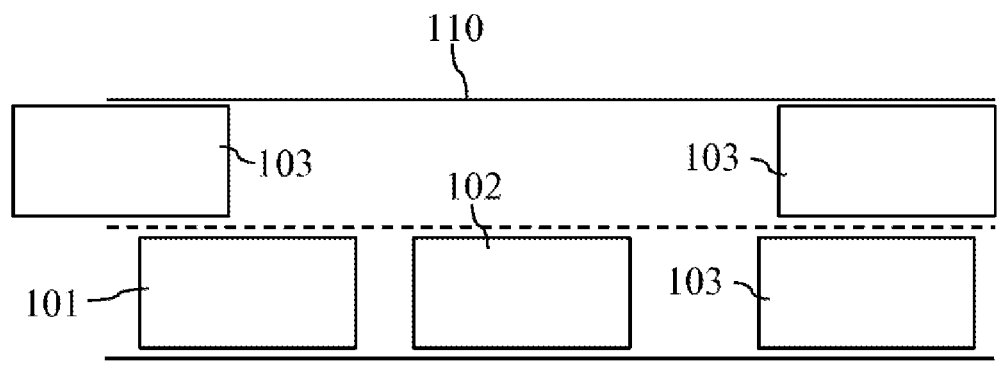
FIG. 1 shows an exemplary driving situation.

As described at the outset, the present document relates to increasing the safety of automated following travel of a vehicle (in particular in conjunction with a steering and lane guidance assistant). In this context, FIG. 1 shows an exemplary driving situation of an ego vehicle 101 on a multilane roadway 110. The ego vehicle 101 is operated with a steering and lane guidance assistant, which is configured for longitudinally and transversely guiding the ego vehicle 101 in an automated manner, in order to keep the ego vehicle 101 in a lane of the roadway 110.

Figure 2:
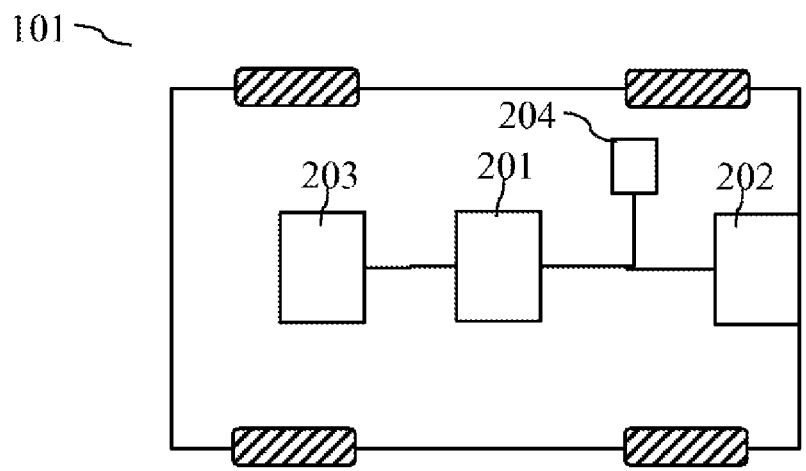
FIG. 2 shows exemplary components of an ego vehicle.

FIG. 2 shows exemplary components of the ego vehicle 101 for providing the steering and lane guidance assistant. The ego vehicle 101 includes one or multiple surroundings sensor(s) 202, which is/are configured for gathering sensor data regarding the surroundings of the ego vehicle 101. Exemplary surroundings sensors 202 are an image camera, a radar sensor, an ultrasonic sensor, and/or a LIDAR sensor. A control unit 201 of the ego vehicle 101 is configured for detecting at least one lane marking on the roadway 110 on the basis of the sensor data. Moreover, the control unit 201 is configured for operating one or multiple longitudinal and/or transverse guidance actuator(s) 203 of the ego vehicle 101 (for example, a drive motor, a braking device, and/or a steering device) as a function of the detected lane marking, in order to keep the ego vehicle 101 within the presently traveled lane of the roadway 110 in an automated manner.

It can be made possible for the driver of the ego vehicle 101 to at least partially carry out the steering of the ego vehicle 101 also during the operation of the steering and lane guidance assistant. For example, an overall steering torque and/or an overall steering angle of the steering can be necessary for keeping the ego vehicle 101 within the lane. A portion of the overall steering torque and/or of the overall steering angle can be provided by the driver of the ego vehicle 101 (for example, via a steering wheel of the ego vehicle 101). The remaining amount of the necessary overall steering torque and/or the necessary overall steering angle can then be provided in an automated manner by an electric transverse guidance actuator or steering actuator 203 of the ego vehicle 101. In this way, a cooperative steering behavior of the driver of the ego vehicle 101 can be made possible. The portion of the steering torque and/or of the steering angle brought about by the driver can be referred to as a steering contribution of the driver.

The control unit 201 can be configured for detecting a preceding vehicle 102 of the ego vehicle 101 on the basis of the sensor data of the one or multiple surroundings sensor(s) 202. In particular, a longitudinal distance from a preceding vehicle 102 can be detected or ascertained on the basis of the sensor data. Moreover, one or multiple lane marking(s) on the roadway 110 can be detected on the basis of the sensor data.

The control unit 201 can be configured for operating the one or multiple longitudinal and/or transverse actuator(s)

203 of the ego vehicle 101 in such a way that the ego vehicle 101 maintains a certain setpoint distance from the preceding vehicle 102 and/or that the ego vehicle 101 remains in a certain lane. In particular, in order to provide the steering and lane guidance assistant, the transverse guidance of the ego vehicle 101 can take place on the basis of a detected lane marking (in order to keep the ego vehicle 101 in a certain lane). Moreover, the longitudinal guidance of the ego vehicle 101 can take place on the basis of a detected preceding vehicle (in order to maintain a certain setpoint distance from the preceding vehicle 102).

During the operation of the steering and lane guidance assistant, it can happen that the lane markings of the roadway 110 at least temporarily cannot be detected (for example, due to relatively heavy traffic, due to contamination on the roadway 110, and/or due to wear and tear of the roadway 110). In order to nevertheless (at least temporarily) maintain the operation of the steering and lane guidance assistant, the control unit 201 can be configured for also carrying out the transverse guidance of the ego vehicle 101 on the basis of the preceding vehicle 102. In particular, (pure) automated following of the preceding vehicle 102 can take place, at least temporarily, and so the ego vehicle 101 follows a trajectory of the preceding vehicle 102. In this way, the availability of the steering and lane guidance assistant can be increased, because temporary or time-limited interruptions of the lane detection can be bridged. This can take place, for example, at relatively low and/or moderate driving speeds (for example, at 100 km/h or less).

An automated lane guidance system according to SAE level 2 (for example, a steering and lane guidance assistant) therefore offers the possibility of pure following travel. Here, the ego vehicle 101 follows the course of the preceding vehicle 102 without the ego vehicle 101 itself detecting lane markings of the roadway 110 on the basis of the sensor data of the one or multiple surroundings sensor(s) 202 in order to determine the course and/or the driving trajectory.

During pure following travel, the risk of a lateral collision can arise, in particular for the case in which the preceding vehicle 102 carries out a lane change on a multilane roadway 110 with lanes in the same travel direction and the ego vehicle 101 follows the preceding vehicle 102 although the adjacent lane is occupied in the area of the ego vehicle 101 by one or multiple other road users 103 (for example, when the preceding vehicle 102 moves into a relatively small gap on the adjacent lane, for example, during slow traffic or in a traffic jam). This applies, in particular, for an ego vehicle 101 that includes no surroundings sensors 202 that are configured for gathering sensor data regarding lateral surroundings of the ego vehicle 101.

In order to reduce the risk of a lateral collision, the lateral dynamics (i.e., the transversal dynamics) of the automated lane guidance system can be reduced, and so the ego vehicle 101 follows the preceding vehicle 102 only with a time delay and/or with reduced (as compared to the preceding vehicle 102) dynamics. Due to the reduction of the lateral dynamics of the ego vehicle 101 during (pure) following travel, the time available to the driver of the ego vehicle 101 for a steering intervention, avoiding the collision, can be increased. Therefore, the safety of a steering and lane guidance assistant can be increased.

Figure 3A:
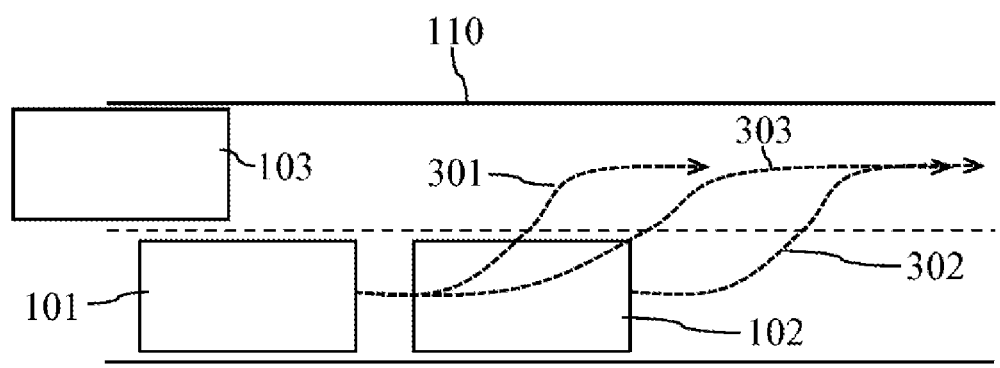
FIG. 3a shows an exemplary adaptation of the transversal dynamics of a steering and lane guidance assistant.

FIG. 3a shows an exemplary lane change of the preceding vehicle 102 along a trajectory 302. During pure following travel, the ego vehicle 101 would follow the preceding vehicle 102 along a following trajectory 301, which substantially corresponds to the trajectory 302 of the preceding vehicle 102, in order to keep the distance between the ego vehicle 101 and the preceding vehicle 102 constant.

Figure 3B:
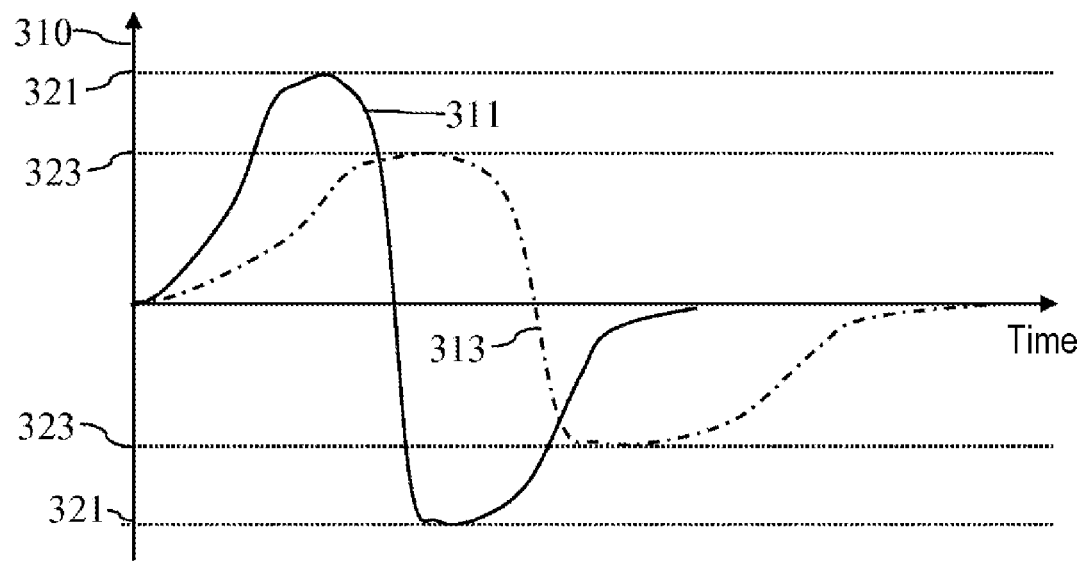
FIG. 3b shows an exemplary adaptation of an operating parameter of a transverse guidance actuator.
Figure 3C:
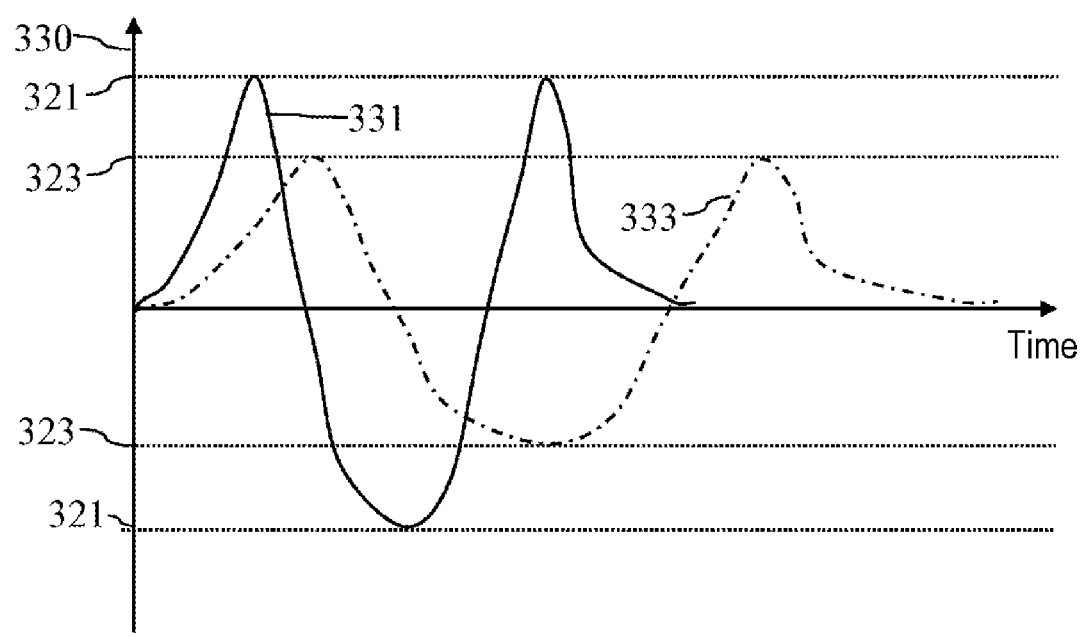
FIG. 3c shows an exemplary adaptation of the gradient with respect to time of an operating parameter of a transverse guidance actuator.

The following trajectory 301 can have relatively high dynamics, as illustrated in FIGS. 3b and 3c. FIG. 3b shows the shape of the curve over time 311 of an operating parameter 310 of a transverse guidance actuator 203 as a function of time during the execution of the following trajectory 301. The operating parameter 310 can be, for example, the steering torque and/or the steering angle. As is apparent from FIG. 3b, the operating parameter 310 for carrying out the following trajectory 301 can have relatively high (with respect to absolute value) maximum values 311. In particular, in order to travel along the following trajectory 301, a relatively high, with respect to absolute value, maximum steering torque and/or a relatively high, with respect to absolute value, maximum steering angle can be necessary.

FIG. 3c shows the shape of the curve over time 331 of the gradient or the rate of change 330 of an operating parameter 310 of a transverse guidance actuator 203 as a function of time during the execution of the following trajectory 301. As is apparent from FIG. 3c, the gradient with respect to time 330 of the operating parameter 310 for carrying out the following trajectory 301 has relatively high (with respect to absolute value) maximum values 311. In particular, a relatively high, with respect to absolute value, gradient with respect to time 330 of the steering torque and/or of the steering angle can be necessary in order to travel along the following trajectory 301.

In order to limit the lateral dynamics of the ego vehicle 101, the permissible maximum values 323 of the one or multiple operating parameter(s) 310 or of the gradient with respect to time 330 of the one or multiple operating parameter(s) 310, which are brought out in an automated manner by an electric transverse guidance actuator 203 of the ego vehicle 101, can be reduced. For example, the maximum provided or providable steering torque can be reduced by the electric transverse guidance actuator 203 of the ego vehicle 101. Alternatively or additionally, the maximum set or settable steering angle can be reduced by the electric transverse guidance actuator 203 of the ego vehicle 101. Moreover, the gradient with respect to time 330 of the provided steering torque and/or of the set steering angle can be reduced.

Due to the limitation of the possible values of the one or multiple operating parameter(s) 310 and/or of the gradients 330 of the one or multiple operating parameter(s) 310 of the transverse guidance actuator 203 of the ego vehicle 101, the lateral dynamics of the ego vehicle 101 during (pure) following travel can be reduced. FIG. 3a shows a modified trajectory 303 of the ego vehicle 101 with reduced lateral dynamics. FIG. 3b shows the shape of the curve over time 313 of the operating parameter 310 for the modified trajectory 303. Moreover, FIG. 3c shows the shape of the curve over time 333 of the gradient 330 of the operating parameter 310 for the modified trajectory 303. As is apparent from FIG. 3a, the lane change takes place more slowly (as compared to the trajectory 301) by utilizing the modified trajectory 303, and so the driver of the ego vehicle 101 has more time to avoid a possible collision with another vehicle 103 on an adjacent lane by means of a steering intervention.

A permanent reduction of the lateral dynamics of the automated lane guidance system during pure following travel results, however, in a reduced availability of the automated lane guidance system during non-critical driving situations (for example, during travel on a lane with relatively great curvature). In particular, due to the reduced lateral dynamics, only trajectories 301, 303 or curves with relatively little curvature would be traveled along in an automated manner by the ego vehicle 101 in pure following travel. During travel on an invariable lane of a roadway 110 that has relatively great curvature, an interruption of the operation of the steering and lane guidance assistant could therefore occur during pure following travel.

The control unit 202 can be configured for ascertaining driver information that indicates how intensively the driver of the ego vehicle 101 monitors the automated longitudinal and/or transverse guidance of the ego vehicle 101. The driver information can be ascertained on the basis of the sensor data of one or multiple driver sensor(s) 204 of the ego vehicle 101. The driver information can indicate, in particular, the steering contribution manually provided by the driver of the vehicle 101 for the steering of the ego vehicle 101. The one or multiple driver sensor(s) 204 can therefore include a steering sensor, which is configured for ascertaining sensor data that indicate the steering contribution of the driver of the ego vehicle 101.

The control unit 202 can be configured for adjusting the lateral dynamics of the ego vehicle 101 during (pure) following travel as a function of the driver information. In particular, relatively high lateral dynamics can be made possible (with a relatively high maximum value 321, 323 of the one or multiple operating parameter(s) 310) when the driver information indicates that the driver is relatively intensively engaged with the driving operation of the ego vehicle 101 (for example, when the driver provides a relatively high steering contribution to the steering of the ego vehicle 101). On the other hand, the lateral dynamics can be relatively greatly limited or reduced (with a relatively low (with respect to absolute value) maximum value 321, 323 of the one or multiple operating parameter(s) 310) when the driver information indicates that the driver is relatively mildly engaged with the driving operation of the ego vehicle 101 (for example, when the driver provides only a relatively low steering contribution to the steering of the ego vehicle 101). In this way, the availability and the safety of a steering and lane guidance assistant can be increased.

Therefore, the driver steering behavior of the driver of the ego vehicle 101 can be observed during the utilization of an automated lane guidance system. The reduction of the dynamics of the automated lane guidance system during pure following travel can then be adjusted as a function of the steering behavior of the driver.

In the case that a steering contribution of the driver fails to appear (for a certain transverse guidance maneuver), the lateral dynamics of the automated lane guidance system in pure following travel can be reduced (if necessary, to a minimum). In such a situation, it can be assumed that the driver of the ego vehicle 101 has largely handed over the vehicle guidance task to the automated lane guidance system (and presumably carries out monitoring only to a relatively low extent).

In the case of a steering contribution of the driver in the same direction of the steering contributions of the automated lane guidance system (i.e. of the transverse guidance actuator 203), a reduction of the lateral dynamics can not take place, if necessary. In such a situation, it can be assumed that the driver of the ego vehicle 101 takes over the actual vehicle guidance task and utilizes the automated lane guidance system only for assistance.

Figure 4:
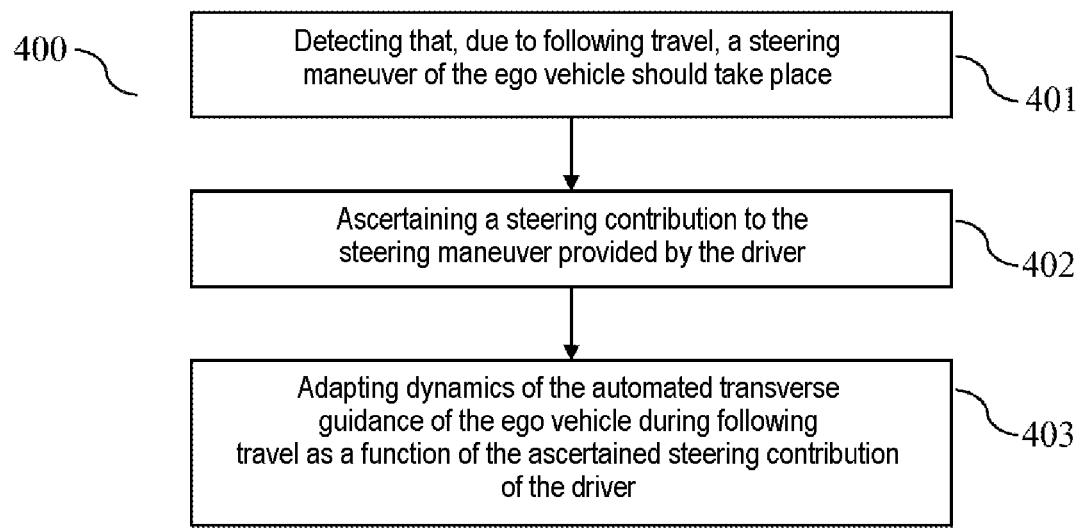
FIG. 4 shows a flowchart of an exemplary method for the transverse guidance of an ego vehicle during following travel.

FIG. 4 shows a flowchart of an exemplary method 400 for the at least semi-automated transverse guidance of an ego vehicle 101 during following travel. The following travel can take place, for example, within the scope of a steering and/or lane guidance assistant (for example, when sufficiently good sensor data regarding a lane marking of the roadway 110 are not available). The ego vehicle 101 can be designed for following, at least intermittently, a preceding vehicle 102 traveling ahead of the ego vehicle 101. The method 400 can be carried out by a control unit 201 of the ego vehicle 101.

The method 400 includes detecting 401 a transverse guidance maneuver of the ego vehicle 101 necessary for the following travel. In other words, it can be detected that an intervention by a transverse guidance actuator 203 (in particular by an electric steering actuator) of the ego vehicle 101 is necessary for the following travel. In particular, it can be detected that a steering intervention by the transverse guidance actuator 203 is necessary, which requires a steering angle and/or a steering torque, which is/are greater, with respect to absolute value, than a certain steering angle and/or steering torque threshold value. Therefore, a necessary transverse guidance maneuver of the ego vehicle 101 can be detected, that will bring about a considerable change in direction of the ego vehicle 101.

In addition, the method 400 includes ascertaining 402 driver information with respect to a driver of the ego vehicle 101. The driver information can include at least one indication of how engaged the driver is with monitoring and/or carrying out the transverse guidance of the ego vehicle 101. In particular, the driver information can indicate which steering contribution (for example, proportionally) of the driver contributes to the necessary steering of the ego vehicle 101. Moreover, it can be ascertained whether the driver is touching the steering means of the ego vehicle 101, for example, the steering wheel. Moreover, information regarding the viewing direction of the driver can be evaluated.

Moreover, the method 400 includes adjusting 403 the dynamics of an intervention, which is carried out in an automated manner by the transverse guidance actuator 203 of the ego vehicle 101, for the transverse guidance maneuver as a function of the ascertained driver information. Relatively high dynamics can be made possible (in order to follow the preceding vehicle 102 as precisely as possible) when the driver information indicates that the driver is relatively intensively engaged with monitoring and/or carrying out the transverse guidance of the ego vehicle 101 or when the driver information indicates that the driver provides a relatively high steering contribution (for example, proportionally) to the steering of the ego vehicle 101. On the other hand, relatively low dynamics can be made possible (in order to reduce the risk of a lateral collision) when the driver information indicates that the driver is relatively mildly engaged with monitoring and/or carrying out the transverse guidance of the ego vehicle 101 or when the driver information indicates that the driver provides a relatively low steering contribution (for example, proportionally) to the steering of the ego vehicle 101.

The adaptation of the lateral dynamics of an automated lane guidance system results in a reduction of the risk of a lateral collision of the ego vehicle 101 during pure following travel. Moreover, due to the described measures, the cooperative utilization of an automated lane guidance system according to SAE level 2 is supported. In particular, it is made possible that the driver utilizes the assistance system as steering assistance. The driver can bring about relatively great support of the assistance system, in that the driver keeps the hands at the steering wheel and, in the process, specifies the course of the ego vehicle 101. If, on the other hand, the driver hands off the vehicle guidance task to the automated lane guidance system to a relatively great extent (and the driver does not actively intervene in the steering), the lateral dynamics of the automated lane guidance system can be reduced. In this way, it can be imparted to the driver, within the scope of a learning process, that a relatively high degree of assistance by the automated lane guidance system is provided only for the case in which the driver retains the responsibility for the vehicle guidance. Therefore, cooperative travel between the vehicle 101 and the driver can be made possible.

The present invention is not limited to the exemplary embodiments shown. In particular, it is important to note that the description and the figures are to illustrate only the principle of the provided methods, devices, and systems.

What is claimed is:

1. A control unit for a first vehicle, which includes a transverse guidance actuator configured for carrying out transverse guidance of the first vehicle in an at least semi-automated manner during following travel, in which the first vehicle is controlled by the control unit to follow a preceding vehicle, wherein the control unit is operatively configured to:
   detect a transverse guidance maneuver of the first vehicle necessary for the first vehicle to continue the following travel;
   ascertain driver information with respect to a driver of the first vehicle, wherein the driver information includes at least one indication of how engaged the driver is with monitoring and/or carrying out the transverse guidance of the first vehicle; and
   adjust dynamics of an intervention, which is carried out in an automated manner by the transverse guidance actuator of the first vehicle, for the transverse guidance maneuver as a function of the ascertained driver information.

2. The control unit according to claim 1, wherein
   the driver information includes a steering contribution of the driver to a steering of the first vehicle;
   a first steering contribution is an indication that the driver is engaged with carrying out the transverse guidance of the first vehicle; and
   a second steering contribution, which is less than the first steering contribution, is an indication that the driver is less engaged with carrying out the transverse guidance of the first vehicle.

3. The control unit according to claim 2, wherein
   a total value of a steering torque and/or of a steering angle are/is to be provided for the transverse guidance maneuver in order to carry out the following travel; and
   the steering contribution indicates the portion of the total value of the steering torque and/or of the steering angle that is provided as a result of an actuation of a steering wheel, of the first vehicle by the driver of the first vehicle.

4. The control unit according to claim 1, wherein
   the dynamics of the intervention by the transverse guidance actuator for the transverse guidance maneuver are set higher when the driver information indicates that the driver is engaged with monitoring and/or carrying out the transverse guidance of the first vehicle than when the driver information indicates that the driver is less engaged with monitoring and/or carrying out the transverse guidance of the first vehicle.

5. The control unit according to claim 1, wherein the control unit is further configured to:
   ascertain setpoint dynamics of the intervention by the transverse guidance actuator for the transverse guidance maneuver that are necessary for carrying out the transverse guidance maneuver for the following travel; and
   set the actual dynamics of the intervention by the transverse guidance actuator for the transverse guidance maneuver to be lower than the setpoint dynamics when the driver information indicates that the driver is relatively less engaged with monitoring and/or carrying out the transverse guidance of the first vehicle; and/or
   set the setpoint dynamics as the actual dynamics of the intervention by the transverse guidance actuator for the transverse guidance maneuver when the driver information indicates that the driver is engaged with monitoring and/or carrying out the transverse guidance of the first vehicle.

6. The control unit according to claim 1, wherein
   the transverse guidance actuator has one or multiple operating parameter(s) that have an effect on the dynamics of the intervention by the transverse guidance actuator; and
   the control unit is configured for adjusting a maximally possible and/or minimally possible value of the one or multiple operating parameter(s) as a function of the driver information; and/or
   the control unit is configured for adjusting a maximally possible and/or minimally possible value of a gradient with respect to time of the one or multiple operating parameter(s) as a function of the driver information; and
   the control unit is configured for reducing with respect to an absolute value, a maximally possible and/or minimally possible value of the one or multiple operating parameter(s) and/or of the gradient with respect to time of the one or multiple operating parameter(s) when the driver information indicates that the driver is relatively less engaged with monitoring and/or carrying out the transverse guidance of the first vehicle.

7. The control unit according to claim 6, wherein the one or multiple operating parameter(s) comprises one or both of:
   a steering torque at a steering device of the first vehicle brought about by the transverse guidance actuator; or
   a steering angle of the steering device of the first vehicle brought about by the transverse guidance actuator.

8. The control unit according to claim 1, wherein the control unit is further configured, within the scope of an automated lane guidance of the first vehicle on a roadway, to:
   ascertain sensor data regarding surroundings of the first vehicle; and
   determine, on the basis of the sensor data, that, although the automated lane guidance can no longer be carried out on the basis of lane markings of the roadway, it can be carried out, at least temporarily, as the following travel on the basis of a preceding vehicle indicated by the sensor data.

9. The control unit according to claim 1, wherein
   the following travel takes place within the scope of a driver assistance system according to SAE level 2; and/or
   the following travel takes place within the scope of a lane guidance assistant, which is configured for guiding the first vehicle at least intermittently in an automated manner along a lane of a roadway;
   the following travel takes place on the basis of a driving trajectory of a preceding vehicle traveling ahead of the first vehicle; and/or the following travel takes place in a semi-automated manner.

10. A method for controlling, by a control unit, at least semi-automated transverse guidance of an first vehicle during following travel, in which the first vehicle is controlled by the control unit to follow a preceding vehicle, wherein the method comprises the acts of:
- detecting a transverse guidance maneuver of the first vehicle necessary for the first vehicle to continue the following travel;
- ascertaining driver information with respect to a driver of the first vehicle, wherein the driver information includes at least one indication of how engaged the driver is with monitoring and/or carrying out the transverse guidance of the first vehicle;
- adjusting dynamics of an intervention, which is carried out in an automated manner by the transverse guidance actuator of the first vehicle, for the transverse guidance maneuver as a function of the ascertained driver information.

* * * * *